(12) United States Patent
Carbaugh et al.

(10) Patent No.: US 12,540,682 B2
(45) Date of Patent: Feb. 3, 2026

(54) FOOT BRAKE MODULE WITH A GUIDING FEATURE ON A RELAY PISTON

(71) Applicant: Bendix Commercial Vehicle Systems LLC, Avon, OH (US)

(72) Inventors: Kristina Carbaugh, Lakewood, OH (US); Christopher L Brubaker, Lakewood, OH (US); Joel Alvarado, Nuevo Leon (MX); Mark B. Rottinger, North Ridgeville, OH (US); Brian J. Riley, New London, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 395 days.

(21) Appl. No.: 18/134,924

(22) Filed: Apr. 14, 2023

(65) Prior Publication Data
US 2024/0344627 A1     Oct. 17, 2024

(51) Int. Cl.
  *B60T 15/02*   (2006.01)
  *F16K 17/10*   (2006.01)
  *F16K 21/04*   (2006.01)
  *B60T 15/04*   (2006.01)

(52) U.S. Cl.
  CPC .............. *F16K 21/04* (2013.01); *F16K 17/10* (2013.01); *B60T 15/04* (2013.01)

(58) Field of Classification Search
  CPC ...... B60T 15/04; B60T 15/027; B60T 15/043; B60T 15/18; F16K 21/04; F16K 17/10
  See application file for complete search history.

(56) References Cited

U.S. PATENT DOCUMENTS

| | | | | |
|---|---|---|---|---|
| 4,575,157 A | * | 3/1986 | Reinecke | B60T 15/18 303/40 |
| 4,915,458 A | * | 4/1990 | Deike | B60T 8/342 303/118.1 |
| 6,116,280 A | * | 9/2000 | Goodell | B60T 13/261 303/69 |

(Continued)

FOREIGN PATENT DOCUMENTS

| CN | 107000726 A | 8/2017 |
|---|---|---|
| CN | 110248854 A | 9/2019 |

(Continued)

OTHER PUBLICATIONS

"Bendix® E-8P® & 10P™ Dual Brake Valves"; Service Data Sheet SD-03-1064; Bendix Commercial Vehicle Systems LLC; Nov. 2014; 8 pages.

(Continued)

*Primary Examiner* — Thomas W Irvin
(74) *Attorney, Agent, or Firm* — Crowell & Moring LLP

(57) ABSTRACT

A valve assembly is provided comprising: an air supply port; an air delivery port; a guide sleeve; and a piston positioned in the guide sleeve and movable between first and second positions to allow air to flow from the air supply port to the air delivery port, wherein a gap is defined between a minor outer diameter of a shaft of the piston and the guide sleeve; wherein the shaft defines an inner bore for passage of air and comprises a plurality of raised surfaces around a circumference of the shaft that narrows the gap and thereby reduces tilting of the piston as it moves in the guide sleeve between the first and second positions. Other embodiments are provided.

19 Claims, 11 Drawing Sheets

(56) References Cited

U.S. PATENT DOCUMENTS

| | | | | |
|---|---|---|---|---|
| 6,206,481 | B1* | 3/2001 | Kaisers | B60T 15/027 |
| | | | | 303/118.1 |
| 10,179,579 | B2* | 1/2019 | Didwiszus | B60T 15/18 |
| 10,723,338 | B2* | 7/2020 | Adamski | B60T 15/027 |
| 11,174,953 | B2* | 11/2021 | Riediger-Janisch | B60T 15/18 |
| 2019/0315329 | A1* | 10/2019 | Adamski | B60T 15/181 |
| 2024/0425022 | A1* | 12/2024 | Jundt | B60T 15/18 |
| 2025/0214556 | A1* | 7/2025 | Adamski | B29C 70/88 |

FOREIGN PATENT DOCUMENTS

| | | |
|---|---|---|
| DE | 10 2021 114 055 A1 | 12/2022 |
| JP | H0 68135 U | 2/1994 |

OTHER PUBLICATIONS

"Bendix® R-12® & R-14® Relay Valves"; Service Data Sheet SD-03-830; Bendix Commerical Vehicle Systems LLC; May 2010; 6 pages.

International Search Report mailed Jul. 4, 2024 for International Application No. PCT/US2024/024607.

Written Opinion mailed Jul. 4, 2024 for International Application No. PCT/US2024/024607.

* cited by examiner

FOOT BRAKE MODULE WITH A GUIDING FEATURE ON A RELAY PISTON

BACKGROUND

A foot brake module is a component of a braking system of a vehicle, such as a tractor/truck that is capable of towing a trailer. In general, the foot brake module has supply ports to receive compressed air from air tanks of the vehicle, delivery ports to supply the received compressed air to braking components of the vehicle, and internal components that control the flow of air between the supply and delivery ports in response to a driver pressing a brake pedal. In some vehicles, the supplied air is used to directly effectuate braking, while, in vehicles with an electronic braking system, the supplied air is used as a backup to electronic brake control signals that are generated in response to movement of the brake pedal.

SUMMARY

The following embodiments generally relate to a foot brake module with a guiding feature on a relay piston. In one embodiment, a valve assembly is provided comprising: an air supply port; an air delivery port; a guide sleeve; and a piston positioned in the guide sleeve and movable between first and second positions to allow air to flow from the air supply port to the air delivery port, wherein a gap is defined between a minor outer diameter of the shaft and the guide sleeve; wherein a shaft of the piston defines an inner bore for passage of air and comprises a plurality of raised surfaces around a circumference of the shaft that narrows the gap and thereby reduces tilting of the piston as it moves in the guide sleeve between the first and second positions.

In another embodiment, a valve assembly is provided comprising: primary and secondary supply ports; primary and secondary delivery ports; a guide sleeve; a first piston configured to move in response to actuation of a brake pedal, wherein movement of the first piston causes air to flow from the primary supply port to the primary delivery port and to cause air to accumulate in a chamber of the foot brake assembly; a second piston configured to move within the guide sleeve in response to an accumulation of air in the chamber, wherein movement of the second piston causes air to flow from the secondary supply port to the secondary delivery port; and a set of guiding features positioned on the second piston to reduce tilting of the second piston in the guide sleeve.

In yet another embodiment, a valve assembly is provided comprising: a guide sleeve; a relay piston positioned in the guide sleeve; and means for reducing tilting of the relay piston as it moves in the guide sleeve.

Other embodiments are possible, and each of the embodiments can be used alone or together in combination.

DETAILED DESCRIPTION

Figure 1:
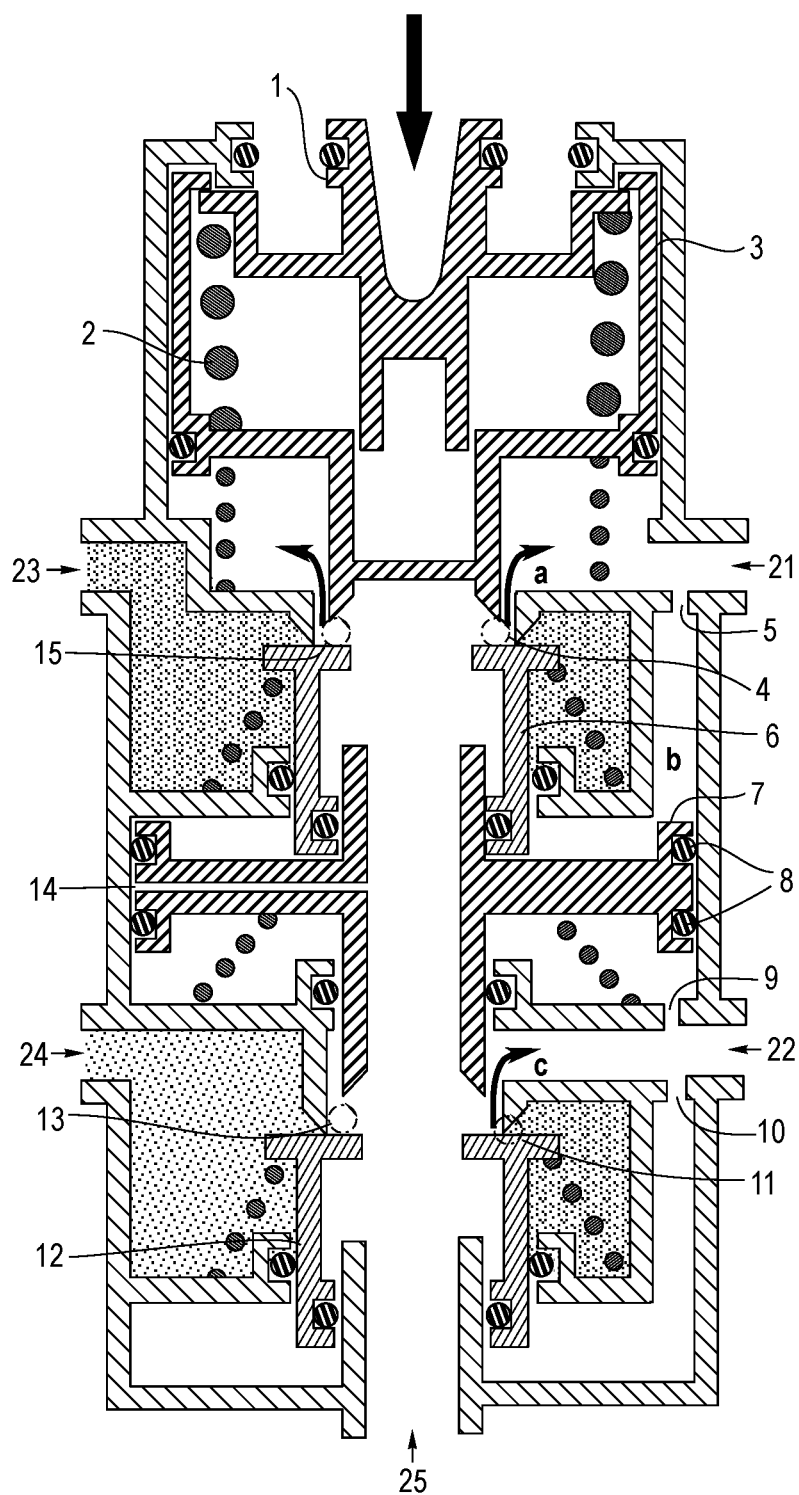
FIG. 1 is a functional view that illustrates how of a foot brake module assembly of an embodiment initiates brake actuation.
Figure 2:
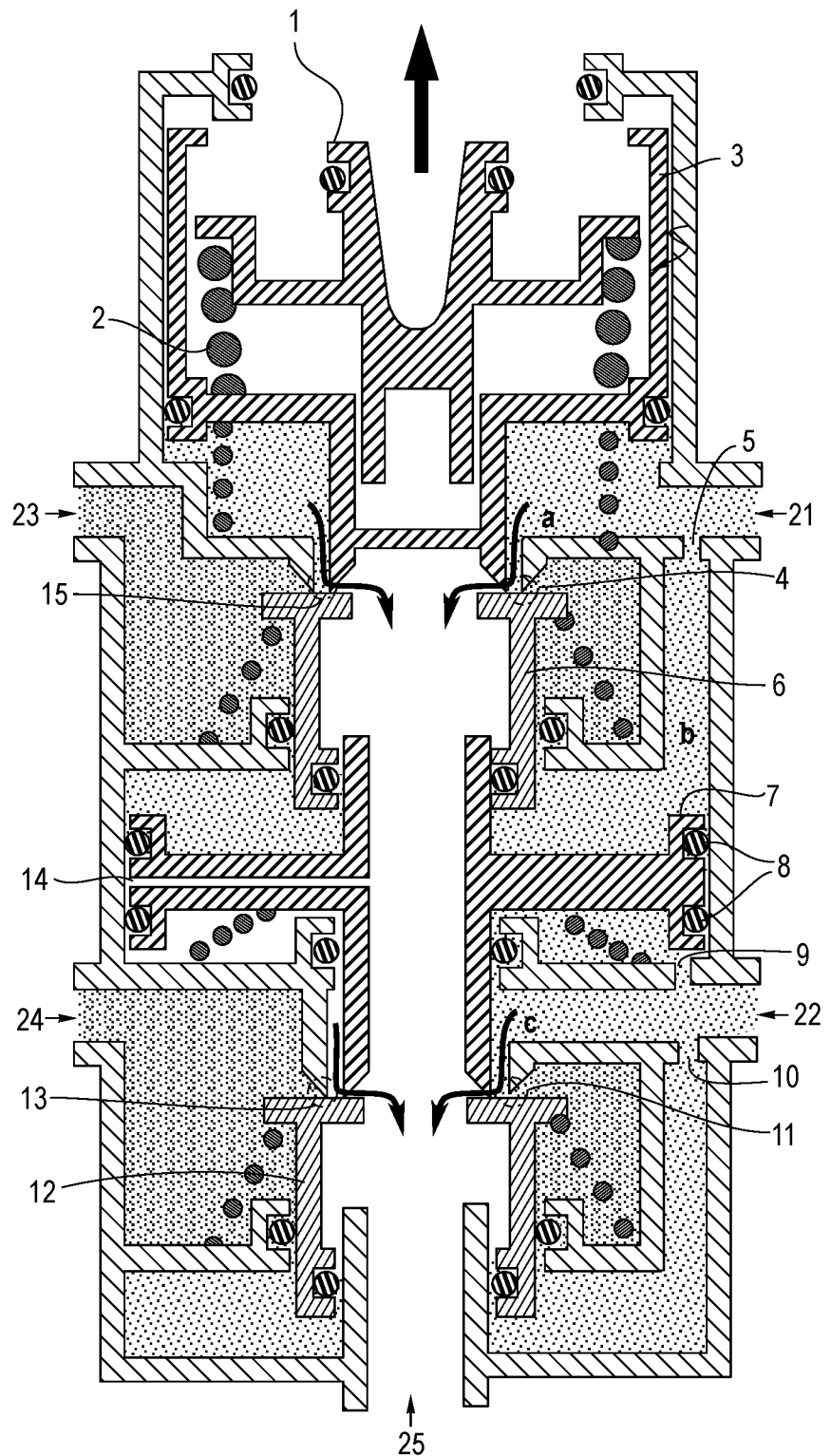
FIG. 2 is a functional view that illustrates how a foot brake module assembly of an embodiment partly releases brakes.

The following embodiments relate to a foot brake module (FBM) assembly (sometimes referred to herein as a "foot brake assembly" or just a "foot brake module (FBM)"). The FBM assembly can be used in any suitable vehicle, such as, but not limited to, a tractor/truck that is capable of towing a trailer. FIGS. 1 and 2 are functional views that illustrate the operation of a FBM assembly of an embodiment in initiating brake actuation (FIG. 1) and partly releasing the brakes (FIG. 2). As shown in these drawings, some of the components of the FBM assembly of this embodiment include, but are not limited to, a thrust member 1 that is configured to be coupled with a foot pedal (not shown), a spring 2, a piston 3, a first inlet 4, a first outlet 5, a first valve body 6, an intermediate (secondary or relay) piston 7, a sealing component 8, a second outlet 9, a third outlet 10, a second inlet 11, a second valve body 12, a first outlet 13, a passage 14, a second outlet 15, primary and secondary delivery ports 21, 22 (sometimes referred to herein as first and second energy outlets), primary and secondary supply ports 23, 24 (sometimes referred to herein as first and second energy inlets), and a vent 25. The primary and secondary supply ports 23, 24 are configured to be coupled (e.g., via air hoses) with primary (e.g., rear) and secondary (e.g., front) air tanks, respectively. The primary and secondary delivery ports 21, 22 are configured to be coupled (e.g., via air hoses) with service brakes of the vehicle.

In operation, when a driver presses the brake pedal, force is applied to the thrust member 1, which causes air to flow from the primary and secondary supply ports 23, 24 to the primary and secondary delivery ports 21, 22. The air exiting the primary and secondary delivery ports 21, 22 is supplied to various braking components in the vehicle (e.g., the rear and front brakes, respectively). By having primary and secondary supply and delivery ports, the FBM assembly provides two braking circuits (one circuit to control the flow of air from the primary supply port 23 to the primary delivery port 21 and another circuit to control the flow of air from the secondary supply port 24 to the secondary delivery port 22). As will be discussed in more delay below, in one embodiment, each braking circuit has its own piston that rests and moves off a valve collar to control the supply of air.

Also, it should be noted that, in some embodiments, the supplied air is used to directly effectuate braking. In other embodiments (e.g., vehicles with an electronic braking system), the supplied air is used to as a backup to electronic brake control signals that are generated in response to movement of the brake pedal.

Turning again to FIG. 1, to initiate braking, when a driver actuates the brake pedal, the piston 3 is displaced by the thrust member 1 via the spring 2. The first valve body 6 is pressed downwards by the piston 3, so that the first inlet 4 of the first brake circuit is opened. Compressed air then flows in from the second inlet 11. Pressure in chamber a increases and is transferred to the brake via primary delivery port 21. When there is an equilibrium of forces at the piston 3 between the compression force of the pressure in chamber a and the spring force of the spring 2, the piston 3 rises until the first inlet 4 is closed by the first valve body 6. Simultaneously, the intermediate piston 7 is moved downward by the pressure in chamber b. The valve body of the second circuit is pressed downwards by the intermediate piston 7, so that the inlet of the second circuit is opened. Compressed air flows in from the second valve body 12. Pressure in chamber c increases and is led to the brake via the secondary delivery port 22. When there is equilibrium of forces at the intermediate piston 7, the piston 7 rises into the neutral position, and the inlet is closed by the second valve body 12.

Turning now to FIG. 2, when the driver partly reduces the application force on the brake pedal, the thrust member 1 moves up, and the force from the spring 2 on the piston 3 becomes less. The compression force on the piston 3 exceeds the force of the spring 2, so that the piston 3 is moved upward and the first inlet 4 is opened. The pressure from chamber a and, therefore, from port 21 is vented out the vent 25. When there is an equilibrium of forces at the piston 3 between the compression force of the pressure in chamber a and the spring force of the spring 2, the piston 3 moves downwards until the first outlet 5 is closed. Simultaneously, the intermeditate piston 7 is moved upwards by the pressure in chamber c prevailing over the pressure in chamber b. The outlet of the second circuit is opened by the intermediate piston 7, so that the pressure in chamber c and, therefore, the second delivery port 22 is partially vented. When there is equilibrium of forces at the intermediate piston 7, the piston moves downwards into the neutral position, and the outlet is closed.

Figure 3:
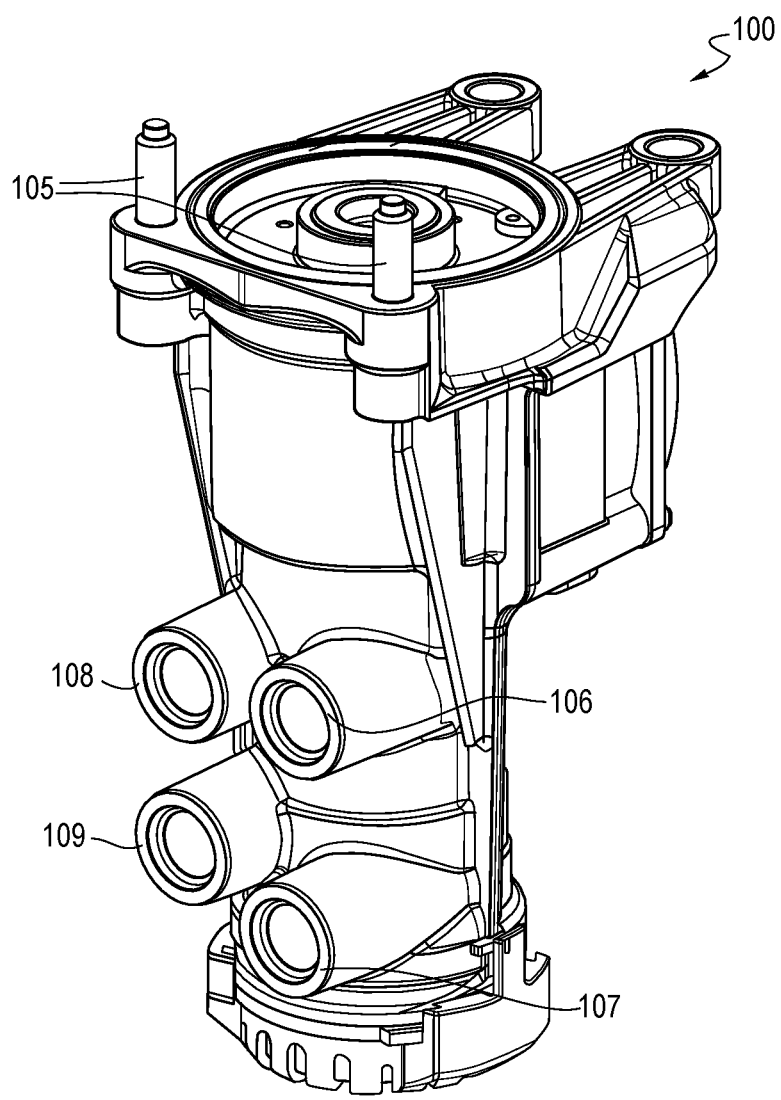
FIG. 3 is a diagram of a foot brake module assembly of an embodiment.
Figure 4:
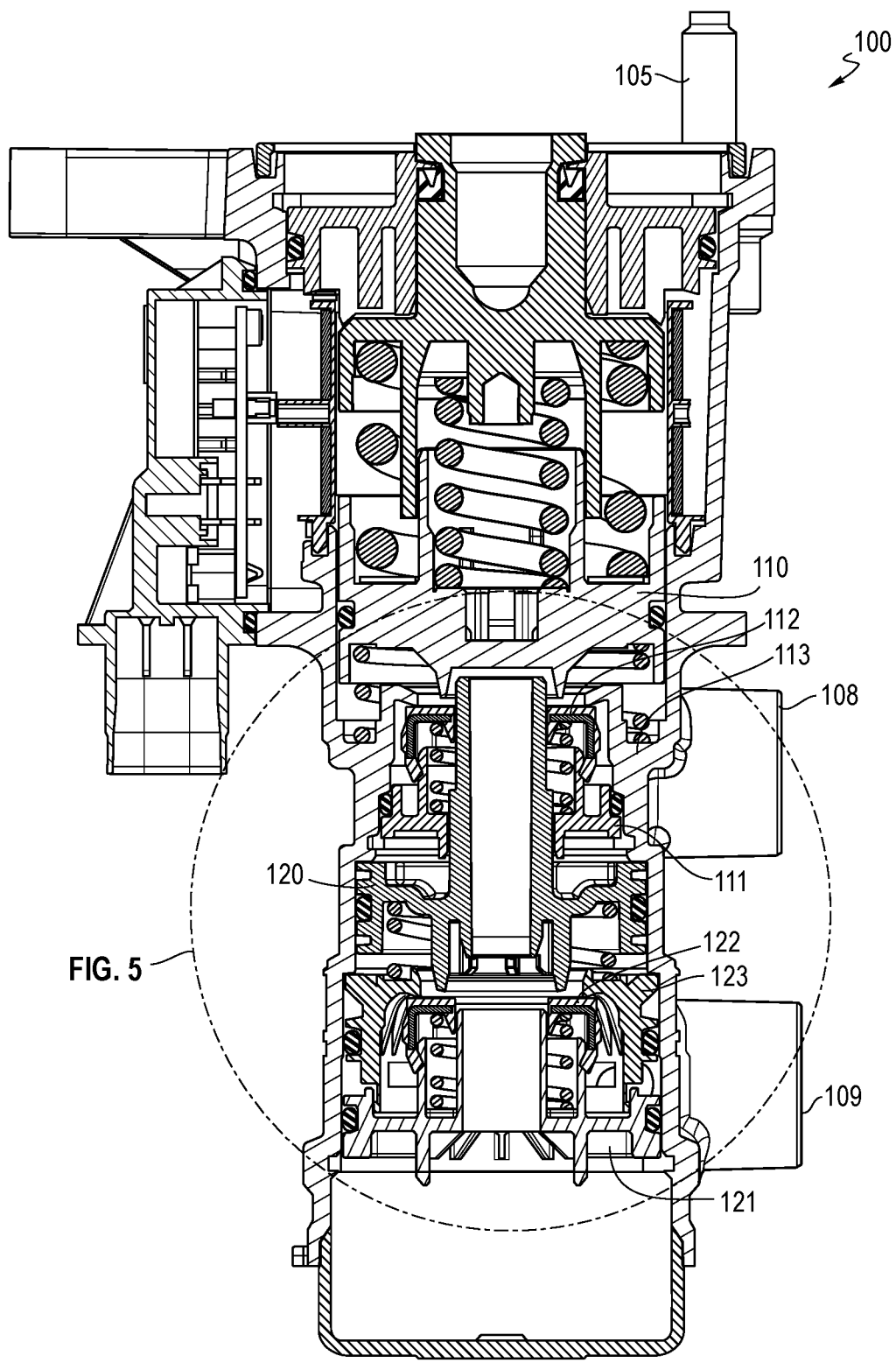
FIG. 4 is a cross-sectional view of the foot brake module assembly of FIG. 3 when a foot brake pedal is not pressed and there is no air flow in primary and secondary circuits of the foot brake module assembly.
Figure 5:
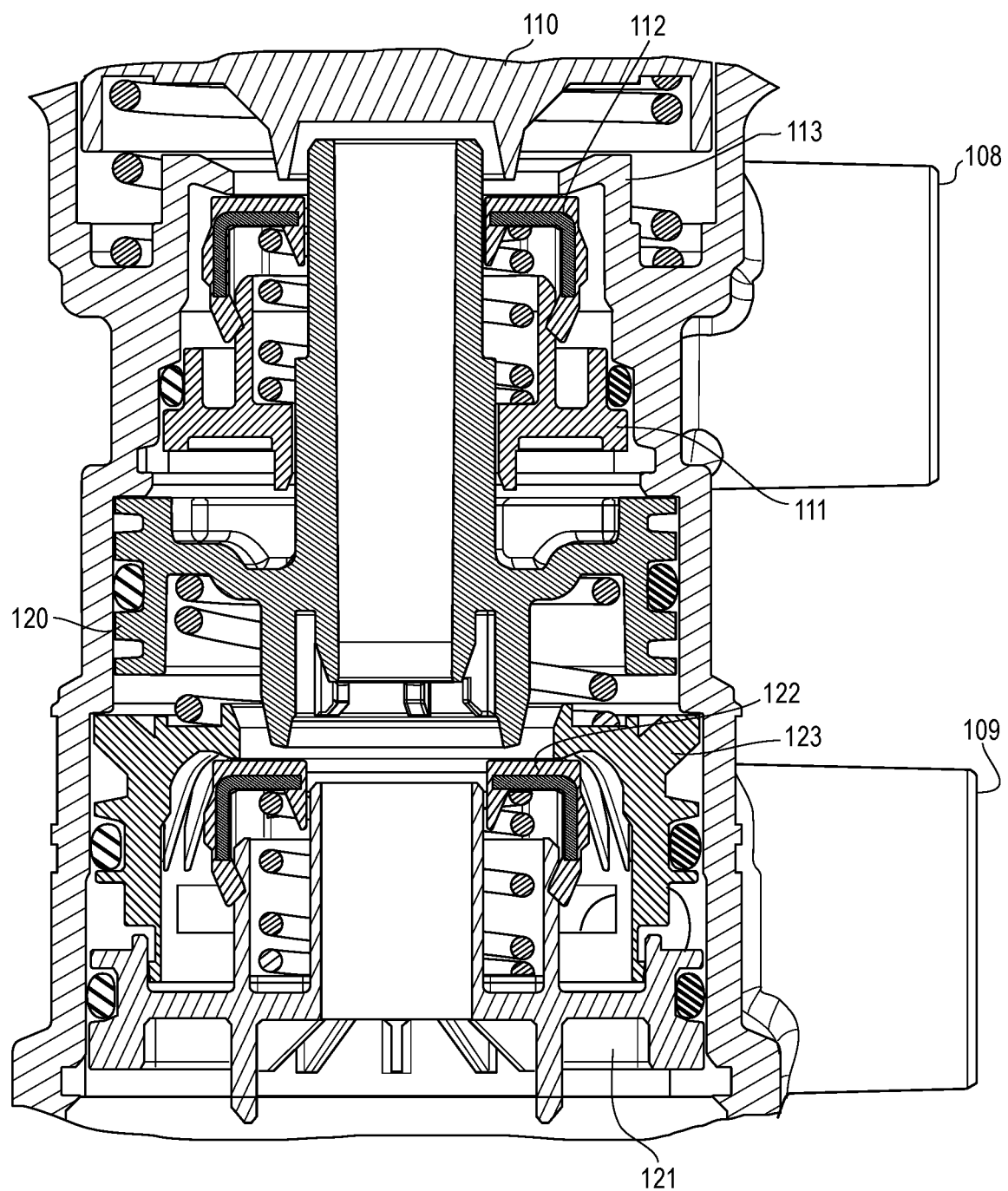
FIG. 5 is an exploded view of a portion of the foot brake module assembly of FIG. 4.

As mentioned above, FIGS. 1 and 2 provide functional views to illustrate the general operation of a FBM assembly. FIG. 3 is a perspective view of another FBM assembly 100 of an embodiment having a different port structure than the FBM assembly shown in FIGS. 1 and 2. As shown in FIG. 3, the FBM assembly 100 of this embodiment comprises mounts 105 for a brake pedal (not shown), primary and secondary supply ports 106, 107, and primary and secondary delivery ports 108, 109. FIG. 4 is a cross-sectional view of the FBM assembly 100, and FIG. 5 is an exploded view of a portion of the FBM assembly 100. As shown in FIG. 4, in this embodiment, the first circuit of the FBM assembly 110 comprises a primary piston 110 positioned in a primary guide sleeve 111, a primary valve collar 112, and a primary valve seat 113. Similarly, the second circuit of the FBM assembly 110 comprises a secondary (relay) piston 120 positioned in a secondary guide sleeve 121, a secondary valve collar 122, and a secondary valve seat 123.

In the configuration shown in FIGS. 4 and 5, the foot brake pedal is not pressed and there is no air flow in primary and secondary circuits. That is, in the primary circuit, the primary valve collar 112 is pressed against the primary valve seat 113, preventing air flow from the primary supply port 106 to the primary delivery port 108. Similarly, in the secondary circuit, the secondary valve collar 122 is pressed against the secondary valve seat 123, preventing air flow from the secondary supply port 107 to the primary delivery port 109.

Figure 6:
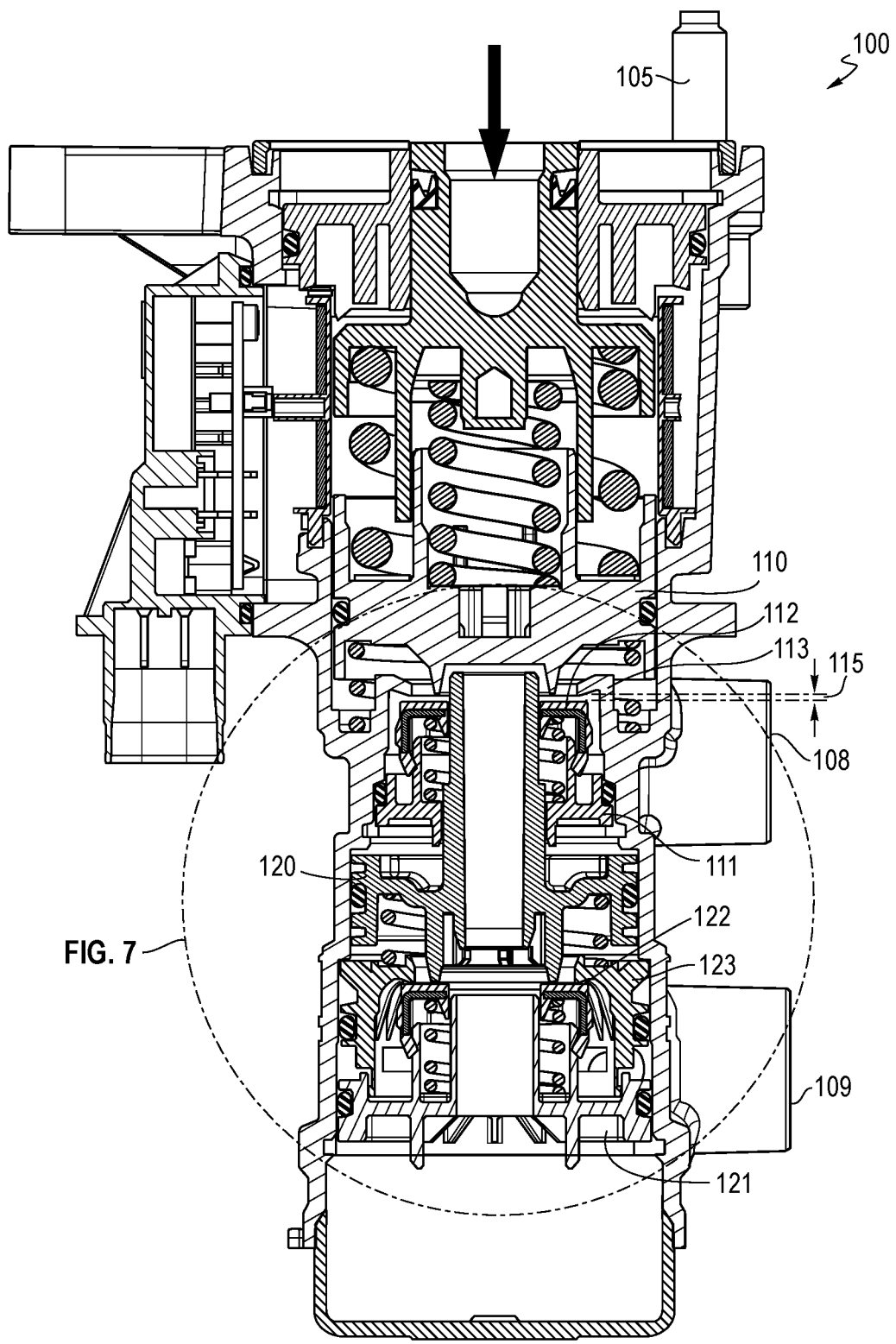
FIG. 6 is a cross-sectional view of FIG. 3 when the foot brake pedal is pressed and there is air flow in the primary circuit but not in the secondary circuit.
Figure 7:
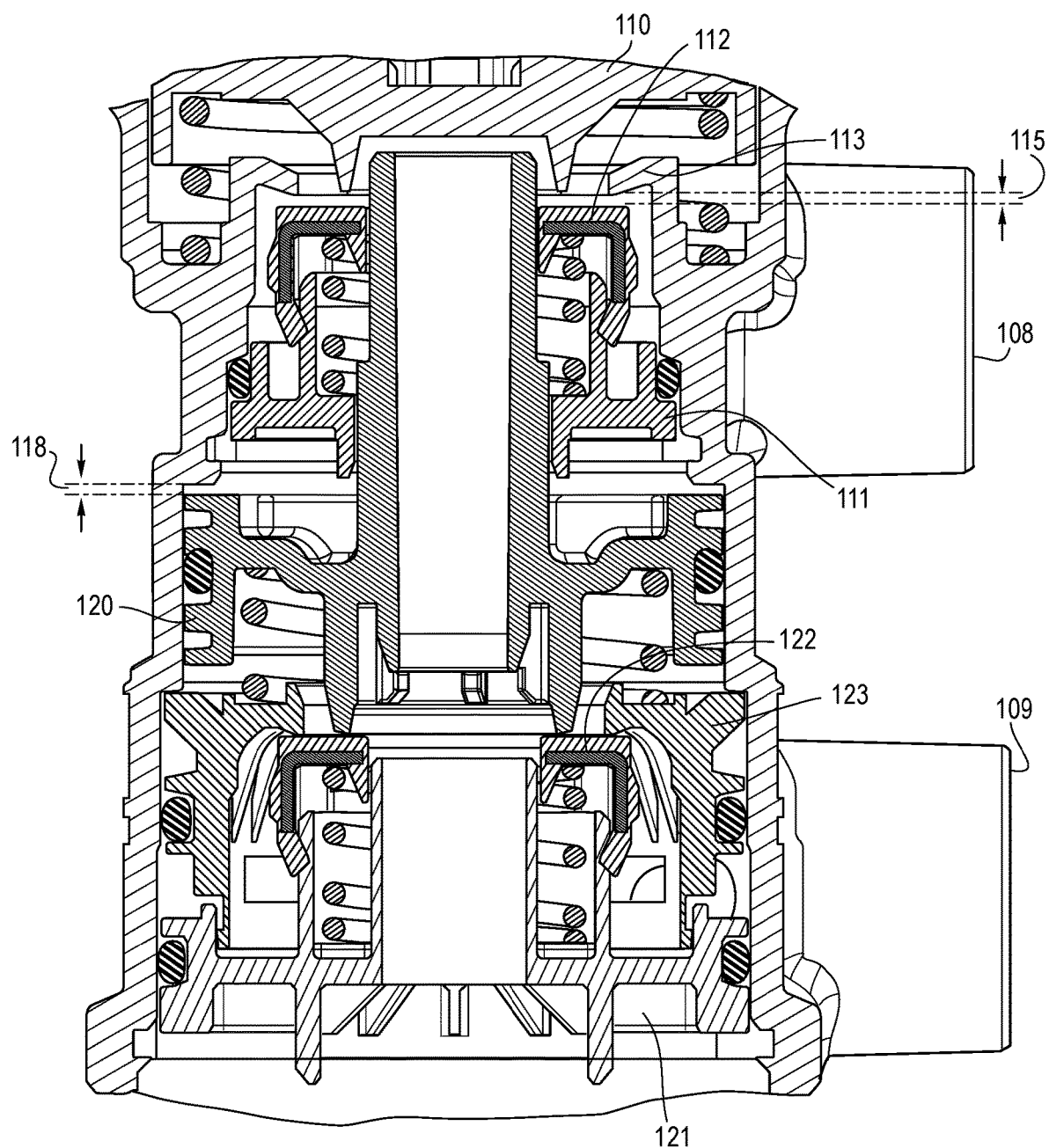
FIG. 7 is an exploded view of a portion of the foot brake module assembly of FIG. 6.
Figure 8:
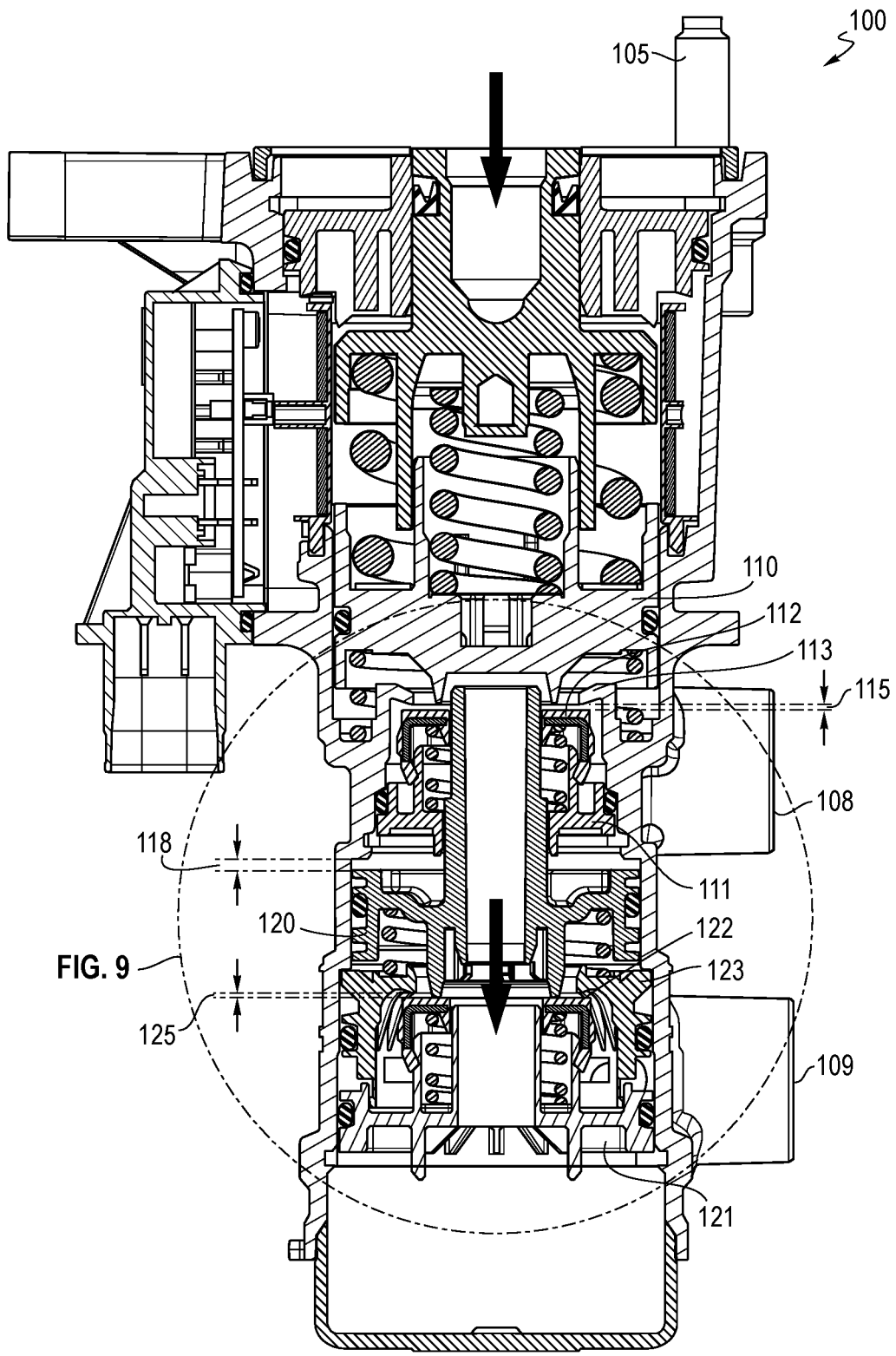
FIG. 8 is a cross-sectional view of FIG. 3 when the foot brake pedal is pressed and there is air flow in both the primary and secondary circuits.
Figure 9:
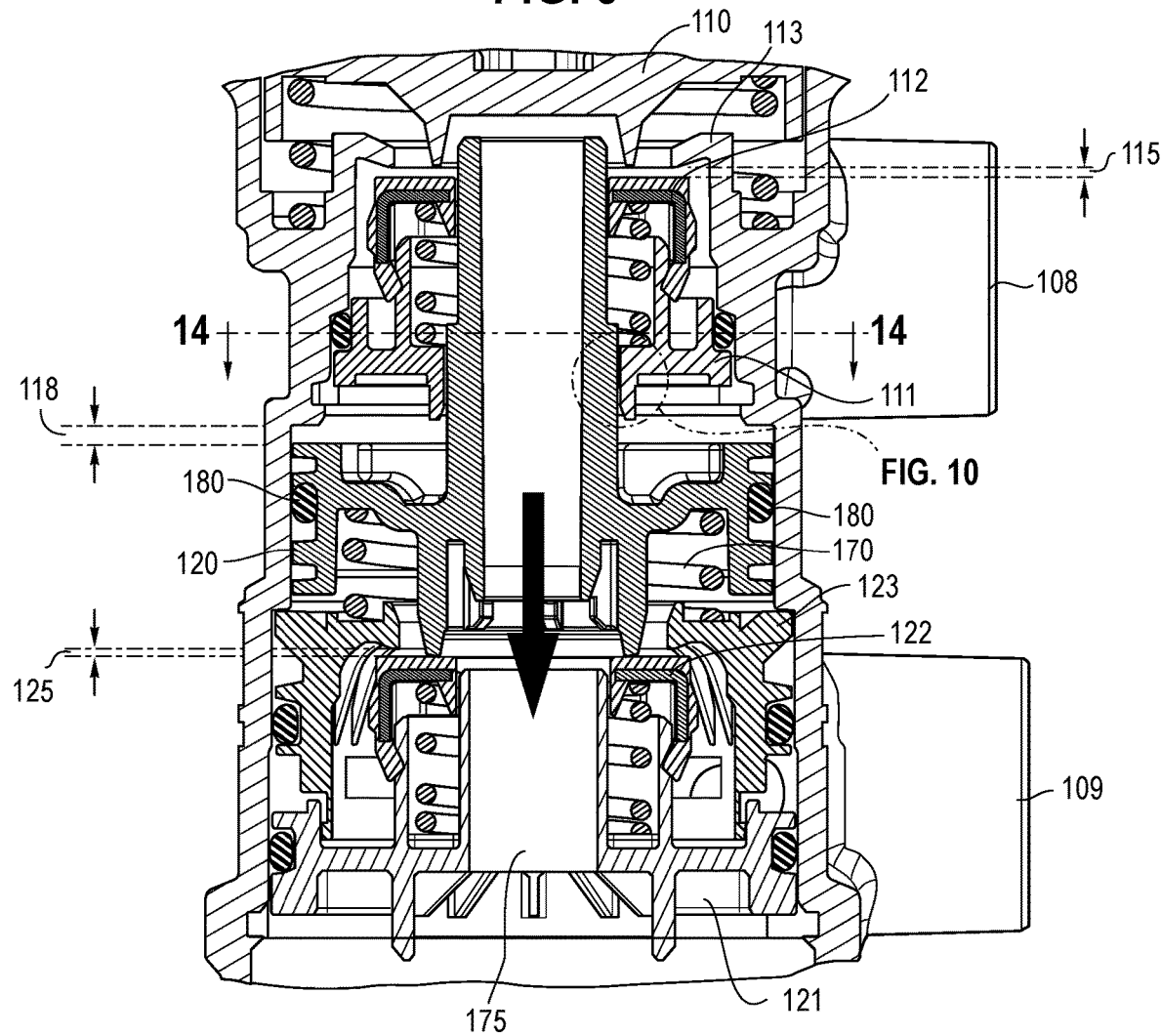
FIG. 9 is an exploded view of a portion of the foot brake module assembly of FIG. 8.

FIGS. 6 and 7 illustrate the operation when the foot brake pedal is pressed and there is air flow in the primary circuit but not in the secondary circuit. As shown in these drawings, when the brake pedal is pressed, force is applied to a thrusting member to move the primary piston 110 downward, which moves the primary valve collar 112 away from the primary valve seat 113. As indicated in FIGS. 6 and 7, this creates an opening 115 for air to flow from the primary supply port 106 to the primary delivery port 108. At this point, the secondary valve collar 122 is still pressed against the secondary valve seat 123, preventing air flow from the secondary supply port 107 to the primary delivery port 109. However, the movement of the primary piston 110 downward also creates an opening 118 through which air from the primary supply port 106 fills the chamber containing the secondary piston 120. As shown in FIGS. 8 and 9, when the pressure in the chamber reaches a threshold, the air in the chamber serves as a pilot to push the secondary piston 120 downward, which moves the secondary valve collar 122 away from the secondary valve seat 123. As indicated in FIGS. 8 and 9, this creates an opening 125 for air to flow from the secondary supply port 107 to the secondary delivery port 109, actuating the secondary braking circuit.

Figures 10, 13:
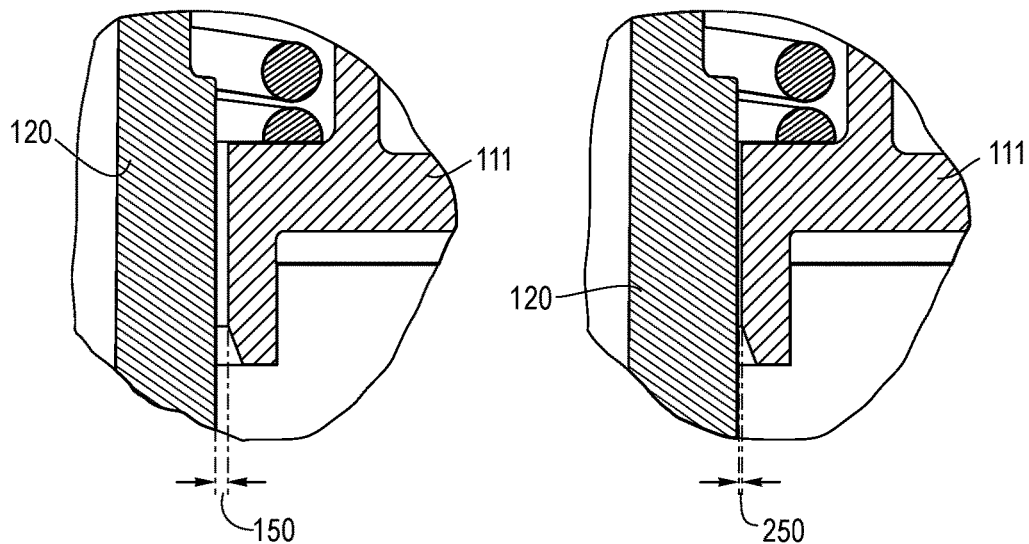
FIG. 10 is an exploded view of a portion of the foot brake module assembly of FIG. 9.
FIG. 13 is a variation of the exploded view of FIG. 10.

FIG. 10 is an exploded view of a portion of the FBM assembly 100 of FIG. 9. This exploded view shows a gap 150 between the secondary piston 120 and the guide sleeve 111. While a certain size gap may be desired to allow the secondary piston 120 to move within the guide sleeve 111 without friction and wear, it may be undesirable if the size of the gap is too large. For example, in some embodiments, the secondary piston 120 is aligned at the first position in FIG. 5 and realigns itself when it reaches the second position in FIG. 9, but is susceptible to tilting in the "free state" in between the first and second positions. This titling can be caused by a moment created by a return spring 170 positioned around the secondary piston 120. Also, the single O-ring 180 can create a pivot point that allows the secondary piston 120 to tilt within guide sleeve 111. When the secondary piston 120 tilts too far during its travel, the sealing surface interference disappears on one side of the secondary piston 120, causing air from the primary and/or secondary supply ports 106, 107 to exhaust through at the bottom of the FBM assembly 100 (i.e., opening up the exhaust path and allowing air flow out the bottom vent), which can be audible. Such tilting can also create wear on the secondary piston 120.

To help center the secondary piston 120 as it travels and overcome these problems, the return spring 170 can be moved from its location between the secondary piston 120 and the valve seat 123 to a centered area 175 and/or a second O-ring can be added for stability. However, while these modifications can help center and reducing tilting of the secondary piston 120, a second O-ring can slow the movement of the secondary piston 120 while moving the spring 170 can reduce airflow by reducing the diameter of the centered area 175, causing a delay in the application and release of the brakes, which may be undesirable and, in some situations, may cause a delay that prevents certain timing standards from being met. Another possible solution is to increase the diameter of the shaft portion of the secondary piston 120 to reduce the gap 150. However, it is possible for the secondary piston 120 to swell due to water absorption, and if the overall diameter of the shaft of the secondary piston 120 is too large, it is possible for the movement of the secondary piston 120 to seize up.

Figure 14:
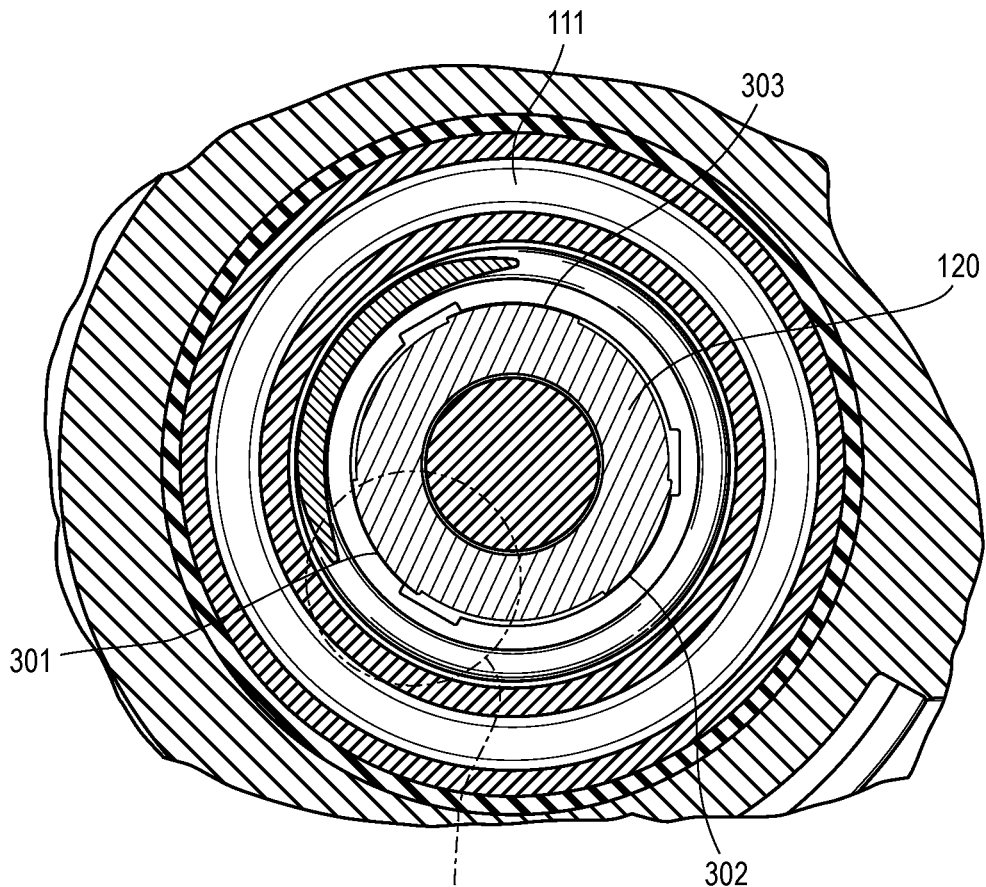
FIG. 14 is a cross-sectional view along line 14-14 in FIG. 9.
Figure 15:
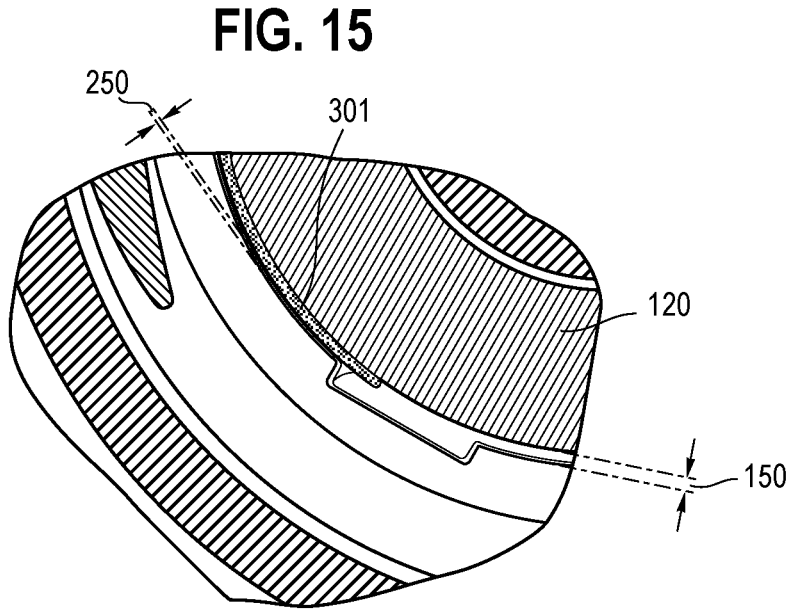
FIG. 15 is an exploded view of a portion of the foot brake module assembly of FIG. 14.

To address these issues, in one embodiment (see FIGS. 11 and 12), a plurality of guiding features (here, raised portions or "ribs" /"fins") 301, 302, 303 are positioned around the circumference of the shaft 200 of the secondary piston 120 and help guide the secondary piston 120 in the guide sleeve 111 and reduce/limit tilting. (In FIG. 12, the portions of the secondary piston 120 are shown in dashed line order to see all three raised portions 301, 302, 303.) This provides a "best of both worlds" solution. As shown in FIG. 13 (which is a variation of FIG. 10 for a portion of the secondary piston 120 that has a raised portion), the raised portions narrow the gap 250 between the secondary piston 120 and the guiding feature 111. However, as shown in FIGS. 12, 14 and 15, this narrowed gap 250 is only in the areas around the circumference of the shaft 200 have the raised portions (creating a major outer diameter that limits/reduces tilt), and the portion of the secondary piston 120 that does not have a raised portion has a larger gap 150 (see also FIG. 10). This narrowed gap 250 limits tilting of the secondary piston 120 and, thus, limits/eliminates audible leakage and regulation violations from a vehicle's Commercial Vehicle Safety Alliance (CVSA) inspection. However, the areas around the circumference of the shaft 200 that do not have the raised portions still have the larger gap 150. That is, as shown in FIGS. 10 and 13, the shaft of the secondary piston 120 has a minor outer diameter in the areas without the raised portions that create a larger gap 150 (FIG. 10) than the gap 250 that is created by the major outer diameter in the areas with the raised portions (FIG. 13). In this way, the raised portions 301, 302, 303 provide the desired tilt control, while the non-raised portions prevent the secondary piston 102 from swelling up enough to stop the secondary piston 120 from moving.

Figure 11:
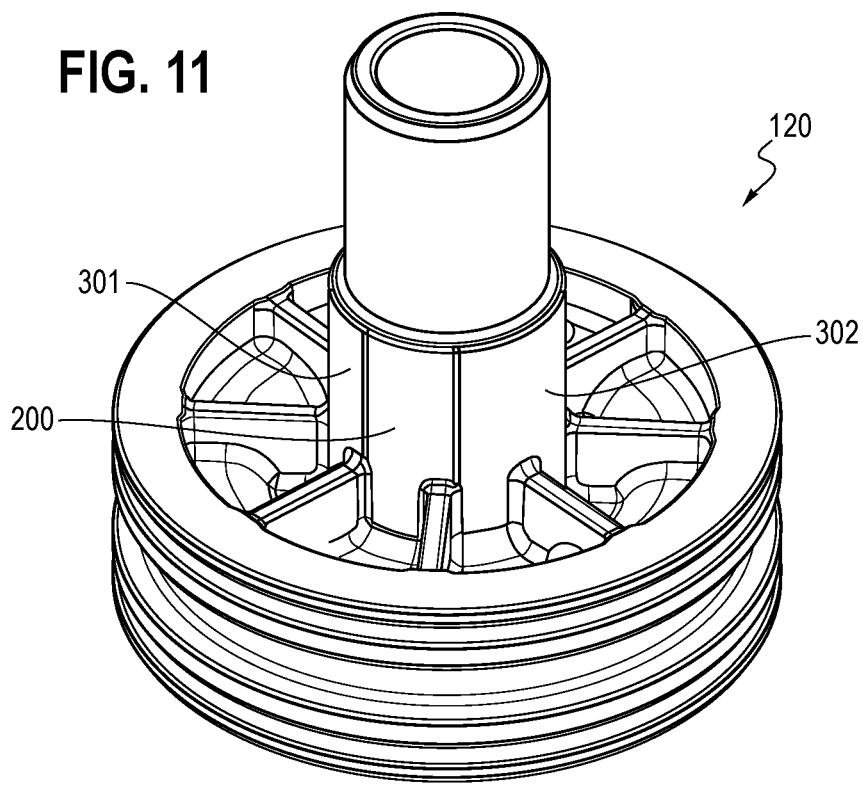
FIG. 11 is an illustration of a secondary piston of a foot brake module assembly of an embodiment having a plurality of raised portions.
Figure 12:
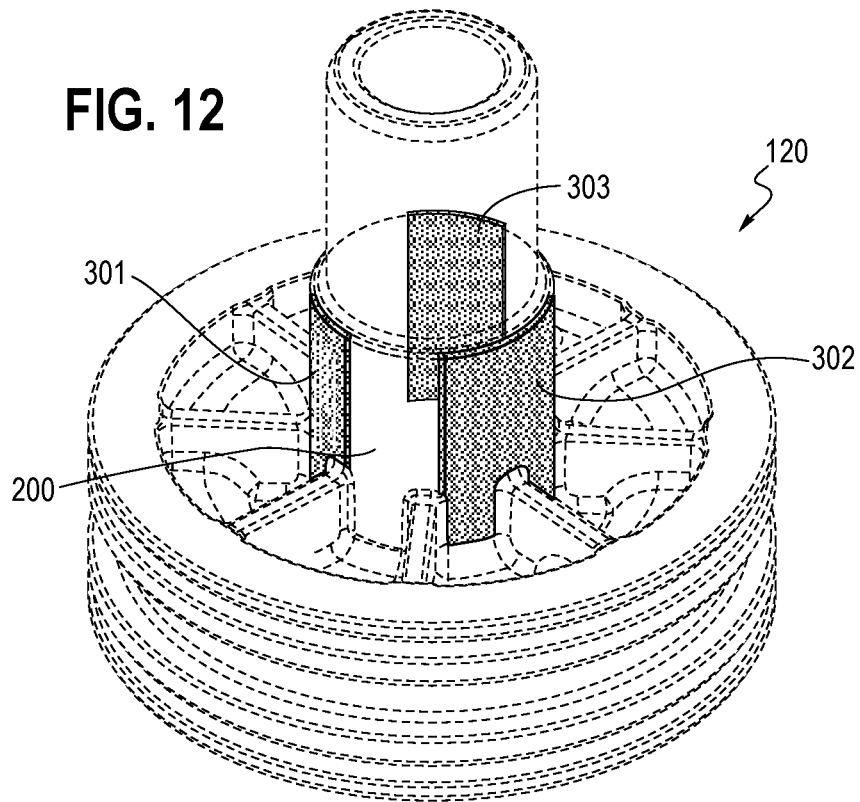
FIG. 12 is another illustration of the secondary piston in FIG. 11 where portions of the secondary piston are shown in dashed lines to illustrate all three raised portions.

In this example shown in FIGS. 11 and 12, the guiding feature took the form of three raised portions arranged in an equidistant, tri-lobular pattern around the circumference of the shaft 200 of the relay piston 120 to create spaced-apart major outer diameters that limit the tilt of the relay piston 120 within the FBM assembly housing. It should be understood that this is merely an example and other implementations can be used. For example, fewer than or more than three guiding features can be used. As such, the phrase "set of" is something used herein to refer to one or more than one member. In some applications, it may be desired to use fewer than eight guiding features, as, if the guiding features are too small, they may get stuck in emergency air ports/channels in the FBM assembly 100. However, other applications may not encounter such a limitation. Also, the set of guiding features can be integrated with the secondary piston 210 during manufacturing or can be added onto an already-manufactured secondary piston 210 (e.g., using a plastic injection molded tool). The later has the advantage of not requiring a design change to an existing secondary piston and can be more easily machined since the secondary piston 120 can be manufactured as a lower tolerance than the set of guiding features. That is, larger features can be easier to manufacture over a normal spline design both from a geometric dimensioning and tolerancing point-of-view and a tooling point of view. Again, the guiding feature can be included in the secondary piston 120 at any suitable stage.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A valve assembly comprising:
   an air supply port;
   an air delivery port;
   a guide sleeve; and
   a piston positioned in the guide sleeve and movable between first and second positions to allow air to flow from the air supply port to the air delivery port, wherein a gap is defined between a minor outer diameter of a shaft of the piston and the guide sleeve;
   wherein the shaft defines an inner bore for passage of air and a plurality of raised surfaces around a circumference of the shaft that narrows the gap and thereby reduces tilting of the piston as it moves in the guide sleeve between the first and second positions.

2. The valve assembly of claim 1, wherein the plurality of raised portions comprises three raised portions.

3. The valve assembly of claim 2, wherein the three raised portions are arranged in a tri-lobular manner around the circumference of the shaft.

4. The valve assembly of claim 1, wherein the plurality of raised portions comprises fewer than eight raised portions.

5. The valve assembly of claim 1, further comprising a spring positioned around the piston and configured to induce a moment to cause the piston to tilt as it moves in the guide sleeve.

6. The valve assembly of claim 1, further comprising a single O-ring around the piston, wherein the single O-ring is insufficient to prevent the piston from tilting as it moves in the guide sleeve.

7. The valve assembly of claim 1, wherein the air supply and delivery ports and the piston are part of a secondary braking circuit of the foot brake assembly.

8. A valve assembly comprising:
   primary and secondary supply ports;
   primary and secondary delivery ports;
   a guide sleeve;
   a first piston configured to move in response to actuation of a brake pedal, wherein movement of the first piston causes air to flow from the primary supply port to the primary delivery port and to cause air to accumulate in a chamber of the foot brake assembly;

a second piston configured to move within the guide sleeve in response to an accumulation of air in the chamber, wherein movement of the second piston causes air to flow from the secondary supply port to the secondary delivery port; and a set of guiding features positioned on the second piston to reduce tilting of the second piston in the guide sleeve.

9. The valve assembly of claim 8, wherein the set of guiding features comprise a plurality of raised portions.

10. The valve assembly of claim 8, wherein the set of guiding features are arranged in a tri-lobular manner around a circumference of a shaft of the piston.

11. The valve assembly of claim 9, wherein the set of guiding features comprise fewer than eight guiding features.

12. The valve assembly of claim 8, further comprising a spring around the second piston that is capable of inducing a moment to cause the second piston to tilt in the guide sleeve.

13. The valve assembly of claim 8, further comprising a single O-ring around the second piston, wherein the O-ring is insufficient to prevent the second piston from tilting in the guide sleeve.

14. The valve assembly of claim 8, wherein the set of guiding features are manufactured with the second piston.

15. The valve assembly of claim 8, wherein the set of guiding features are added onto the second piston after manufacturing of the second piston.

16. A valve assembly comprising:
a guide sleeve;
a relay piston positioned in the guide sleeve; and
means for reducing tilting of the relay piston as it moves in the guide sleeve, wherein the means for reducing tilting comprises a plurality of raised surfaces along a circumference of a shaft of the relay piston.

17. The valve assembly of claim 16, wherein the plurality of raised surfaces are arranged in a tri-lobular pattern.

18. The valve assembly of claim 16, further comprising a spring positioned around the relay piston so as to induce a moment to cause the relay piston to tilt as it moves in the guide sleeve.

19. The valve assembly of claim 16, further comprising only a single O-ring around the relay piston, which is insufficient to prevent the relay piston from tilting as it moves in the guide sleeve.

* * * * *